United States Patent [19]

Mowry, Jr.

[11] Patent Number: 5,340,159
[45] Date of Patent: Aug. 23, 1994

[54] VARYING TONE SECURITY DOCUMENT

[75] Inventor: William H. Mowry, Jr., Dayton, Ohio

[73] Assignee: The Standard Register Company, Dayton, Ohio

[21] Appl. No.: 24,666

[22] Filed: Mar. 1, 1993

Related U.S. Application Data

[63] Continuation-in-part of Ser. No. 729,363, Jul. 12, 1991, Pat. No. 5,197,765.

[51] Int. Cl.$^5$ .............................................. B42D 15/00
[52] U.S. Cl. ........................................ 283/93; 283/94; 283/95; 283/902
[58] Field of Search .................... 283/93, 94, 95, 902

[56] References Cited

U.S. PATENT DOCUMENTS

| | | |
|---|---|---|
| 3,675,948 | 7/1972 | Wicker . |
| 3,784,289 | 1/1974 | Wicker . |
| 4,168,088 | 9/1979 | Somlyody . |
| 4,210,346 | 7/1980 | Mowry, Jr. et al. . |
| 4,227,719 | 10/1980 | McElligott et al. . |
| 4,227,720 | 10/1980 | Mowry, Jr. et al. . |
| 4,265,469 | 5/1981 | Mowry, Jr. et al. . |
| 4,310,180 | 1/1982 | Mowry, Jr. et al. . |
| 4,341,404 | 7/1982 | Mowry, Jr. et al. . |
| 4,351,547 | 9/1982 | Brooks, II . |
| 4,360,548 | 11/1982 | Skees et al. . |
| 4,420,175 | 12/1985 | Mowry, Jr. . |
| 4,579,370 | 4/1986 | Corwin et al. . |
| 4,582,346 | 4/1986 | Caprio et al. . |
| 4,662,651 | 5/1987 | Mowry, Jr. . |
| 4,733,887 | 3/1988 | Mowry, Jr. . |
| 5,018,767 | 5/1991 | Wicker . |
| 5,074,956 | 12/1991 | Castagnoli . |

FOREIGN PATENT DOCUMENTS 2217258 10/1989 United Kingdom ................ 283/93

Primary Examiner—Mark Rosenbaum
Assistant Examiner—Frances Han
Attorney, Agent, or Firm—Killworth, Gottman, Hagan & Schaeff

[57] ABSTRACT

An improved security document according to the present invention includes a substrate having a surface for carrying indicia. The document has background printed matter, consisting of a pattern of elements of a first size and frequency, printed at a first density on the surface. The document further has a cancellation term, consisting of a pattern of elements of a second size and frequency, printed at a second density on the surface. Elements of one of the first size or the second size are sufficiently small such that they are not reproduced by a color copier at a particular copier setting, and elements of the other of the first size or the second size are sufficiently large such that they are reproduced by the color copier at the particular copier setting. As a result, a copy of the security document made on a color copier displays the cancellation term. At least a portion of the security document surface is divisible into a plurality of bands extending across the surface. The sizes of the elements and the density of the background printed matter and the cancellation term vary together across the bands in a direction generally normal to the bands. As an alternative, the frequencies of the elements may vary across the bands such that the density of the background printed matter and the density of the cancellation term are changed. Such a document may be printed with different colors of ink on different portions of the document, and with the bands in which a color transition occurs being printed with two colors of ink at differing screen angles.

48 Claims, 13 Drawing Sheets

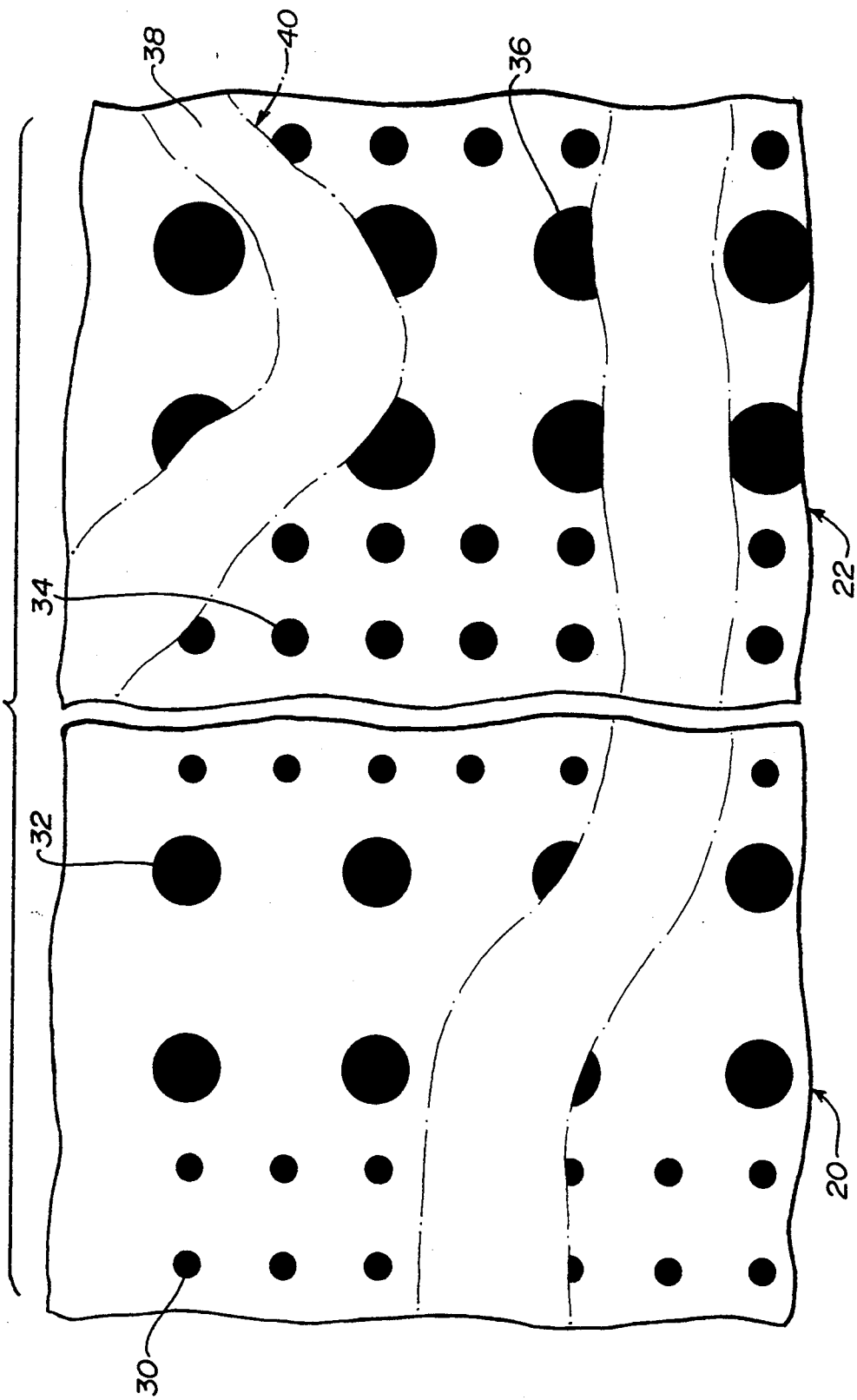

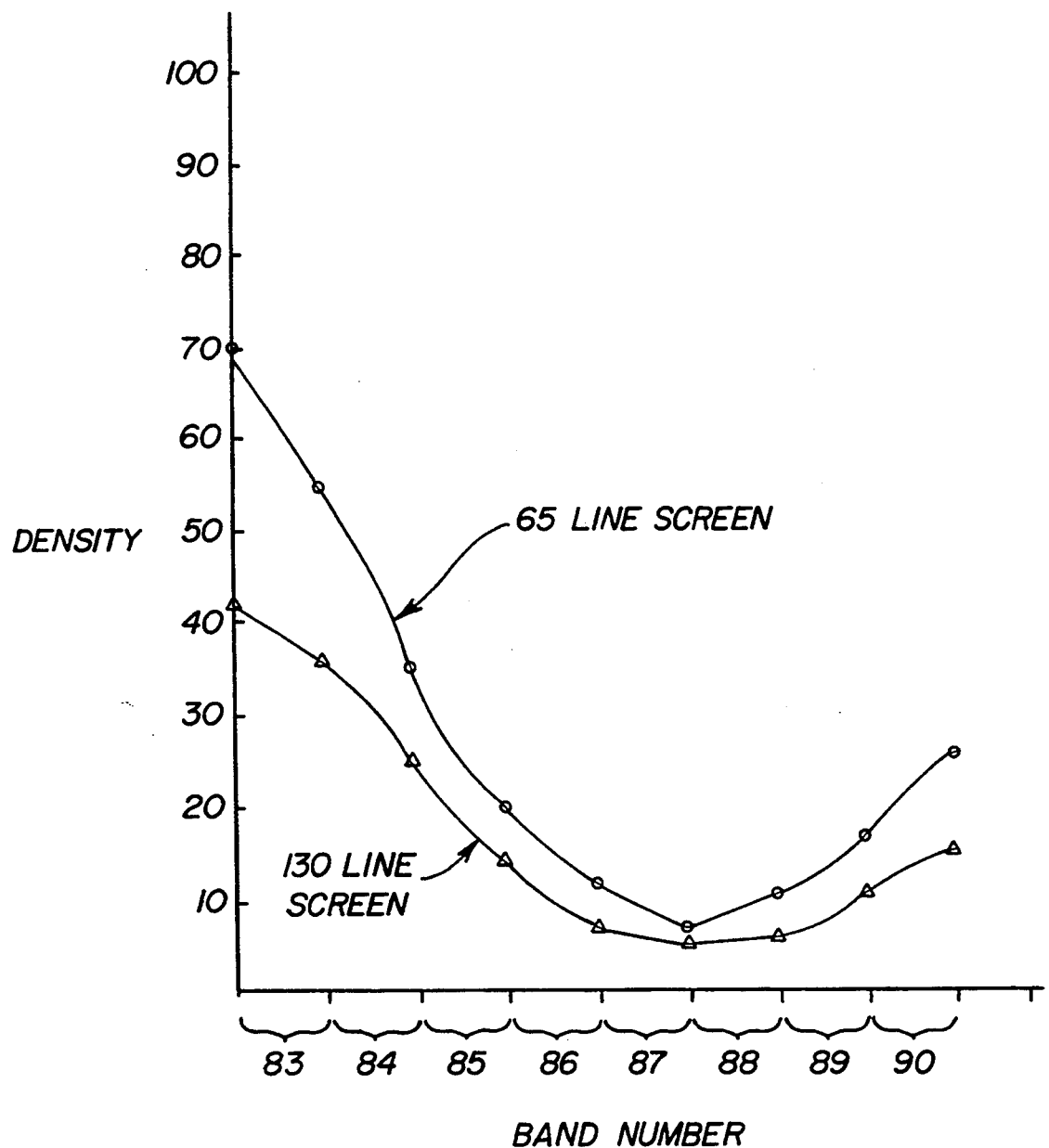

VARYING TONE SECURITY DOCUMENT

This is a continuation-in-part of U.S. patent application Ser. No. 07/729,363, filed Jul. 12, 1991 now U.S. Pat. No. 5,197,765 entitled VARYING TONE SECURITY DOCUMENT.

BACKGROUND OF THE INVENTION

The importance of making various types of documents safe from nefarious duplication is readily apparent. The development of the color copier has resulted in significant concern in this regard. The quality of color reproductions that can be made with a color copier has become so good that it may be very difficult to distinguish the original documents from the color reproductions. Even if a reproduction is not an exact copy, the reproduction often appears reasonably authentic in the absence of the original for comparison purposes. As a consequence, there has been concern that color copiers could be used to reproduce security documents, such as checks, stock certificates, automobile title instruments, and other documents of value, for illegal purposes. This concern has been heightened with the advent of desk top publishing software and hardware, including personal computers and scanners. Such desk top publishing systems allow sophisticated image processing and printing not previously generally available.

Many techniques have been developed to prevent improper reproduction of security documents. One of the most successful is the use of a hidden warning message which is readily apparent on reproduced copies of a document, but which is invisible, or nearly so, on the original document.

Examples of this technique are shown in U.S. Pat. Nos. 4,227,720 and 4,310,180. A single tone warning phrase and a single tone background pattern are used. Tone refers to the visual effect produced by solid ink coverage or by halftone dots, bars, or marks which cover a portion of a printed area and which usually have a frequency that is measured in dots, lines, or marks per inch. Halftone dots, bars, or marks may be more or less uniformly distributed over an area to produce the visual effect, i.e., less than full tone, of a lighter overall color with the use of a darker color ink printed at less than full area coverage. The warning phrase and background pattern area tones are of different frequency and are made up of dots, bars, or marks of differing size but they are selected to provide similar appearance to the eye of a casual observer. A less than full tone effect may also be produced by full area coverage of a paler color of ink than the darker color of ink used for the halftone dots, bars, or marks.

Because the tone of the warning phrase and the tone of the background pattern are selected to be the same, these two areas have much the same visual impact on an observer of the original document, and the warning phrase is not readily perceived. The optics of color copiers have typically been unable to reproduce relatively small halftone dots, lines or other elements. As a consequence, reproduced copies of the original document will have a noticeable warning phrase.

A camouflage pattern is sometimes utilized to obscure the warning phrase further. The camouflage pattern may be defined by areas in which the dots, bars, or marks have been deleted from both the warning phrase and the background pattern. The camouflage pattern may also be defined by a pattern of dots, bars, or marks which are smaller than or larger than those used in the background pattern and the warning phrase, or by areas of complete coverage of a paler ink.

In recent years, color copiers have been improved substantially. These new color copiers have made the above technique less effective in protecting documents. By manipulating the control settings on such copiers, copies can be made of such documents in which the warning phrase does not appear on reproductions when some of the most commonly used frequency and size combinations are used. Furthermore, desk top publishing systems now available in conjunction with laser printers, offer additional possibilities for unauthorized copying. Therefore, it is clear that improvements in this technique are desirable.

One such improvement is shown in U.S. Pat. No. 4,351,547, which also utilizes a single tone background and a single tone cancellation phrase. In this improved technique, the warning phrase is not defined by dots or elements of the same size and frequency. Instead, the warning phrase is defined by an alternating dot pattern which includes large dots of lower frequency than the background tone, and small dots located in exact registry with the large dots.

U.S. Pat. No. 4,579,370 represents another improvement in the use of a hidden warning phrase. The background and warning phrase are each made up of halftone dots of two pairs of dot sizes. For example, the background might be made with about 50% of 130 lines per inch 0.005 inch diameter, and the balance of 130 lines per inch, 0.006 inch diameter; the cancellation term might be made with about 50% of the dots of 65 lines per inch, 0.010 inch diameter and the balance of 65 lines per inch, 0.012 inch diameter. This provides additional protection for documents against improper copying.

These methods have generally been successful in protecting documents at most copier settings. However, by adjusting the settings for sharpness and lightness/darkness it has still been possible on some copiers for a skilled individual to produce a copy in which the warning phrase is not visible.

Therefore, there remains a need in the art for a security document which provides improved protection against copying over a wide range of copier settings, or against manipulation using desk top publishing systems.

SUMMARY OF THE INVENTION

This need is met by an improved security document according to the present invention including a substrate having a surface for carrying indicia. The document includes background printed matter on the surface, the background printed matter consisting of a pattern of elements of a first size and a first frequency such that the background printed matter is printed at a first density perceived by an observer as a first tone. The document further includes a cancellation term printed on the surface, the cancellation term consisting of a pattern of elements of a second size and a second frequency such that the cancellation term is printed at a second density perceived by an observer as a second tone. Elements of one of the first size or the second size are sufficiently small such that they are not reproduced by a color copier at a particular copier setting, and elements of the other of the first size or the second size are sufficiently large such that they are reproduced by the color copier at the particular copier setting. As a result, a copy of the security document made on a color copier displays the cancellation term. At least a portion of the security document surface is divisible into a plurality of bands extending across the surface. The sizes of the elements of the first and second sizes vary across each of the bands such that the density of the background printed matter and the density of the cancellation term vary together across each of the bands on the surface, preferably in a direction generally normal to the bands. By this arrangement, copying the security document without the cancellation term being apparent on at least some portion of the copy is impeded.

As an alternative, the frequencies of the elements of the first and the second frequency may vary across each of the bands such that the density of the background printed matter and the density of the cancellation term vary together across each of the bands on the surface in a direction generally normal to the bands. As a further alternative, the sizes of the elements of the first and second sizes may vary across each of the bands and the frequencies of the elements of the first and second frequency may vary across each of the bands such that the density of the background printed matter and the density of the cancellation term vary together across each of the bands on the surface in a direction generally normal to the bands.

The density of the background printed matter and the density of the cancellation term may vary together linearly across each of the plurality of bands. The tone of each portion of the surface printed with those elements which are sufficiently large such that they are reproduced by the color copier at the particular copier setting may be greater than the tone of adjacent portions of the surface printed with elements which are sufficiently small such that they are not reproduced by a color copier at a particular copier setting. Alternatively, these tones may be substantially the same.

A camouflage pattern may be provided on the surface to disguise the cancellation term. The camouflage pattern may be defined by the absence of elements of the first and second sizes. Alternatively, the camouflage pattern may be defined by the presence of further elements.

The density of the background printed matter and the density of the cancellation term may vary together in a nonlinear fashion across at least some of the bands. The density of the background printed matter and the density of the cancellation term may vary together in a logarithmic manner across at least some of the plurality of bands. The density of the background printed matter and the density of the cancellation term along each edge of each band may be substantially the same as the density of the background printed matter and the density of the cancellation term along the edge of the adjacent band, respectively.

A plurality of cancellation terms may be printed on the surface, with at least some of the cancellation terms being printed over more than one of the plurality of bands. The cancellation term may consist of a plurality of letters, each of which is approximately two bands in height. The plurality of cancellation terms and the plurality of bands may vary in height.

The color of the background printed matter and the color of the cancellation term may vary together over the surface. The upper portion of the security document may be printed with a first color and the lower portion of the security document may be printed with a second color. The color transition area in the central portion of the security document may be printed in both colors at a relatively low density.

The screen angle of the pattern of elements in the central portion printed with the first color may differ from the screen angle of the pattern of elements in the central portion printed with the second color, thereby facilitating a smooth transition between colors.

Accordingly, it is an object of the present invention to provide an improved security document in which the tone of the document varies over at least a portion of the document surface such that a cancellation term that is not readily apparent on the document appears on copies of the document; to provide such a document in which at least a portion of the document surface may be divided into a plurality of generally parallel bands, with the tone of the document varying in different manners in each of the bands; to provide such a document in which the tone of the background printed matter and the tone of the cancellation term are similar, but not equal; and to provide such a document in which the letters making up the cancellation term extend over more than one band.

Other objects and advantages of the invention will be drawings and the following description, the accompanying drawings and the appended claims.

BRIEF DESCRIPTION OF THE DRAWINGS

FIG. 3 is an illustration of two different areas on the surface of the document, greatly enlarged;

FIG. 14 illustrates graphically the changes in image density of yet another embodiment of the present invention.

DESCRIPTION OF THE PREFERRED EMBODIMENT

Figure 1:
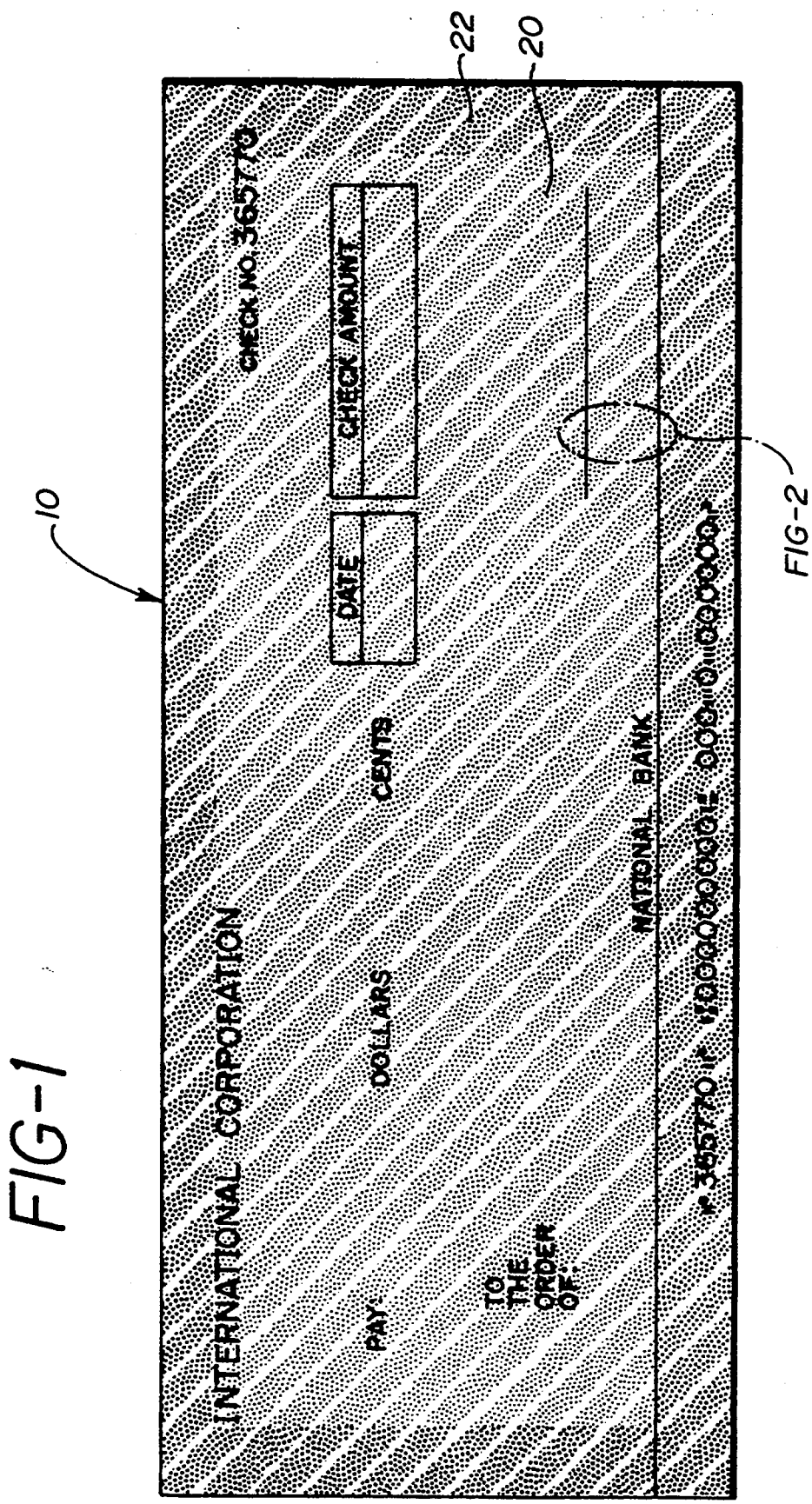
FIG. 1 illustrates a check according to the present invention as it would appear to a casual observer.

FIG. 1 illustrates a check 10 made according to the present invention, as seen by a casual observer, with a lighter tone area, first part 20, and a darker tone area, second part 22. The lighter appearance of first part 20 is due to smaller element size which results in a smaller percentage of the area of first part 20 that is covered with ink compared to second part 22. The second part 22 is shown as defining a complete border around first part 20. However, it may form only a partial border. It will be appreciated that the first part 20 may be darker than the second part 22, if desired.

Figure 2:
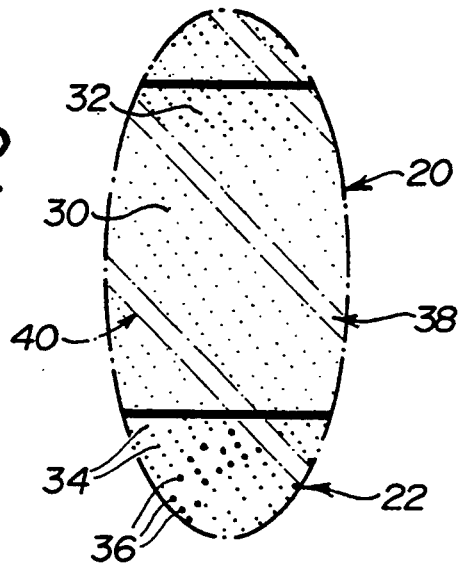
FIG. 2 is an enlarged portion of the check of FIG. 1.

FIG. 2 is a detailed illustration of a portion of check 10. FIG. 2 shows sections of first part 20 and second part 22. First part 20 contains elements of first background printed matter 30 and first warning phrase or cancellation term 32. The elements of first background matter 30 are illustrated as being smaller than those of first cancellation term 32, but they could be larger, as well.

Second part 22 has elements of second background printed matter 34 and second cancellation term 36. The elements of second background printed matter 34 are represented as being smaller than those of second cancellation term 36; alternatively, they could be larger, however. The elements of second background printed matter 34 are represented as being larger than those of first background printed matter 30, and the elements of second cancellation term 36 are shown as being larger than those of first cancellation term 32. However, they could be smaller.

The frequencies of the elements in the first and second background printed matter may be the same or they may be different. Similarly, the frequencies of the elements of the first and second background terms may be the same or different. For instance, one useful combination would be 130 lines per inch at 10% and 65 lines per inch at 15% in the first part, and 130 lines per inch at 20% and 65 lines per inch at 25% in the second part. Another useful combination might be 130 lines per inch at 10% and 65 lines per inch at 15% for the first part, and 120 lines per inch at 20% and 60 lines per inch at 25% in the second part.

Phantom dotted lines 40 do not actually appear on the check. They have been used merely to show the edges of the camouflage image 38. The camouflage image may be defined by the absence of the elements of the first and second background printed matter and first and second cancellation terms. It may also be defined by the presence of elements of a larger or smaller size than the background elements.

FIG. 3 shows an enlarged view of an area of the first part 20 and second part 22 on a different security document. The camouflage image 38 consists of wavy lines on the illustrated document. The elements of the first background printed matter 30 are smaller than the elements of first cancellation term 32. The elements of second background printed matter 34 are smaller than the elements of second cancellation term 36, but larger than the elements of first background printed matter 30. The elements of second cancellation term 36 are larger than the elements of first cancellation term 32.

The frequency of the elements of first background printed matter 30 is the same as the frequency of second background printed matter 34. The frequency of the elements of first and second cancellation terms 32 and 36 is the same, and it is less than that of first and second background printed matter 30 and 34.

The relationship between the size and frequency of the elements explains the difference in the appearance of the two parts. First part 20 appears to be lighter in tone than second part 22 because there is a lower percentage of the document surface covered with ink in relation to the total area of the document surface in first part 20; first part 20 is therefore of a lighter tone than second part 22. This is advantageous in that if a copier is adjusted to obscure or eliminate a cancellation term in first part 20 of a copy, the cancellation term in the second part 22 will appear on the reproduced copy. Similarly, if the copier is adjusted to obscure or eliminate the cancellation term in the second part 22 of the copy, the cancellation term in first part 20 will appear on the reproduced copy.

It should be appreciated that the tone of an area of a document, that is the darkness or lightness of the document as it appears to the eye of an observer, is not a function of only density of the halftone printing elements. It is true, however, that with a halftone screen of a given number of lines per unit length, a greater density which results from larger halftone dots will produce a darker tone. It has been found, however, that an area having large, widely spaced dots will appear lighter in tone than another area having smaller, more closely spaced dots, even though the amount of document surface covered by ink per unit area is the same in each instance.

Figure 4:
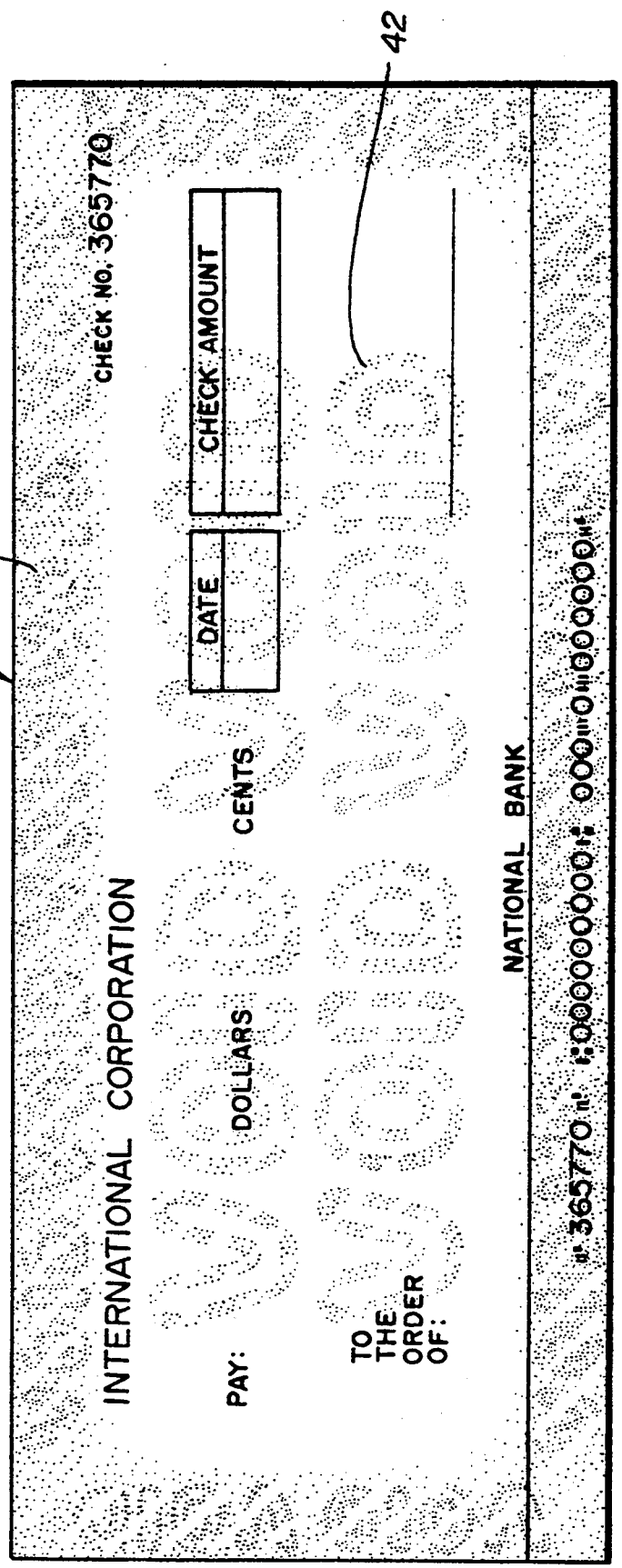
FIG. 4 illustrates the appearance of a reproduction of the document of FIG. 1 obtained on a color copier or desk top publishing system.
Figure 5:
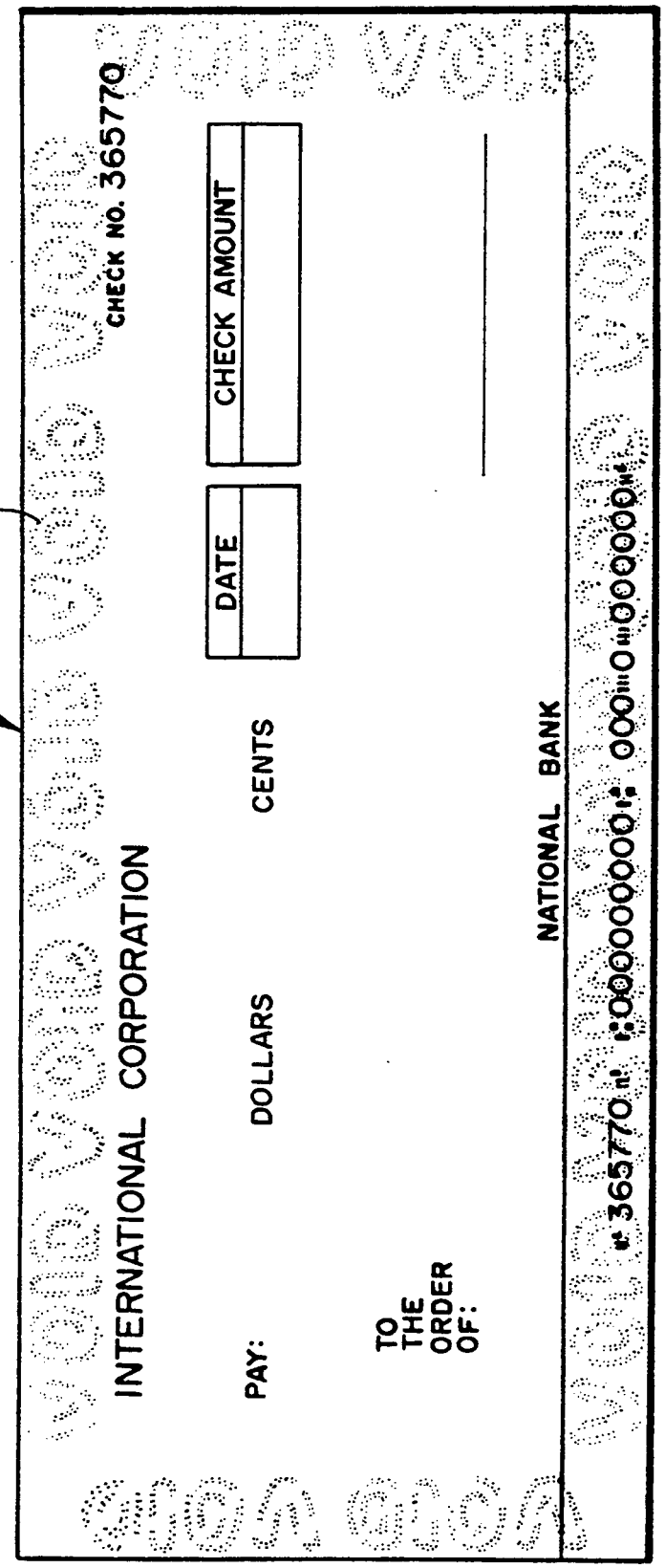
FIG. 5 is a drawing, similar to FIG. 4, illustrating the appearance of a reproduction obtained on a color copier or desk top publishing system at different control settings.
Figure 6:
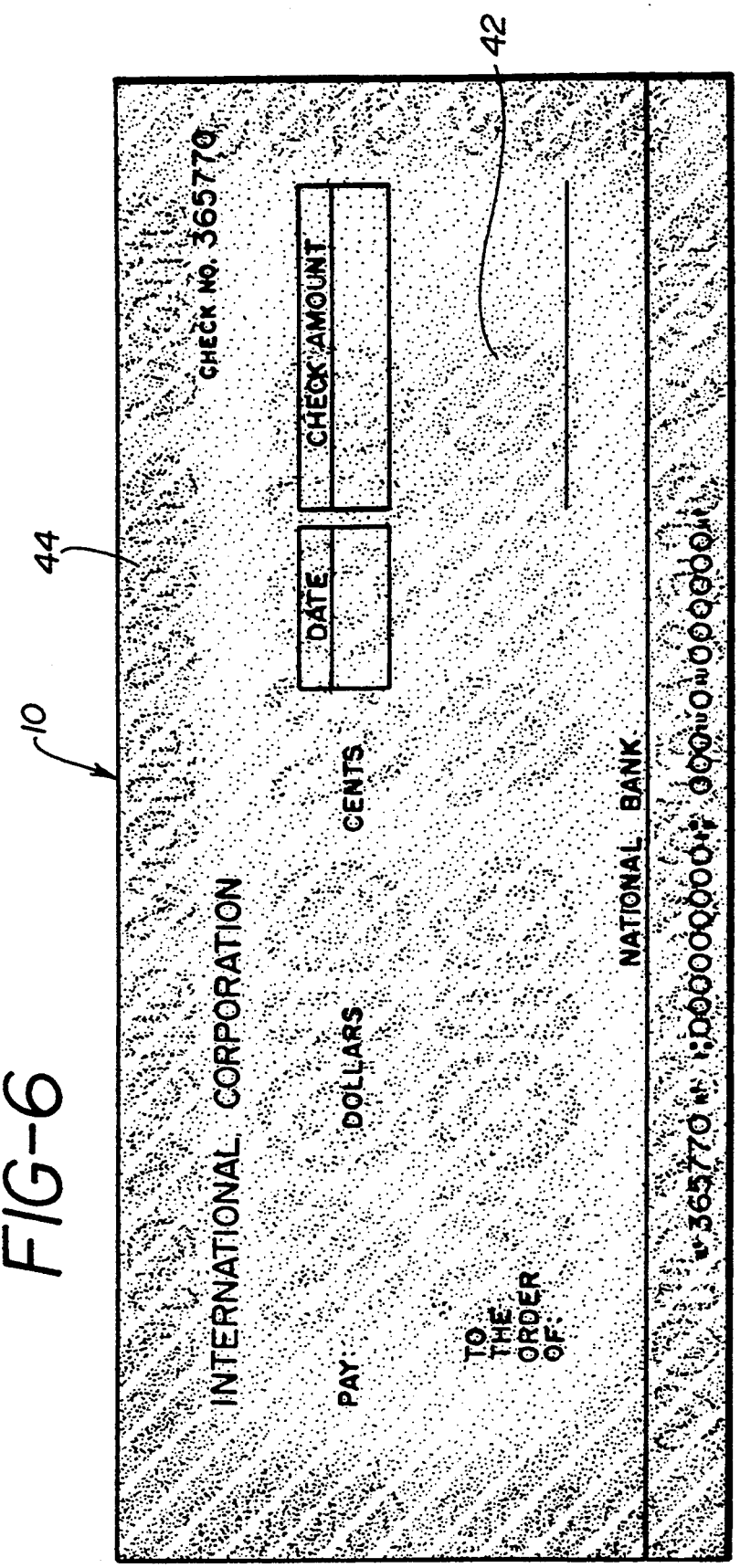
FIG. 6 is drawing, similar to FIG. 4, illustrating the appearance of a reproduction obtained on a color copier or desk top publishing system at other control settings.

FIGS. 4, 5, and 6 represent the results of various attempts to copy the check 10 of FIGS. 1 and 2 on a color copier. In FIG. 4, when the copier is adjusted to obscure cancellation term 44 in second part 22, cancellation term 42 in first part 20 appears clearly on the reproduced copy.

In FIG. 5, if the copier is adjusted to lighten the copy to eliminate cancellation term 42 in first part 20, the adjustment produces a copy in which cancellation term 44 in second part 22 is clearly visible on the reproduced copy. Finally, in FIG. 6, when the copier is adjusted to obscure cancellation term 42 in first part 20 of the reproduced copy, cancellation term 44 in second part 22 is readily apparent on the reproduced copy.

Figure 7:
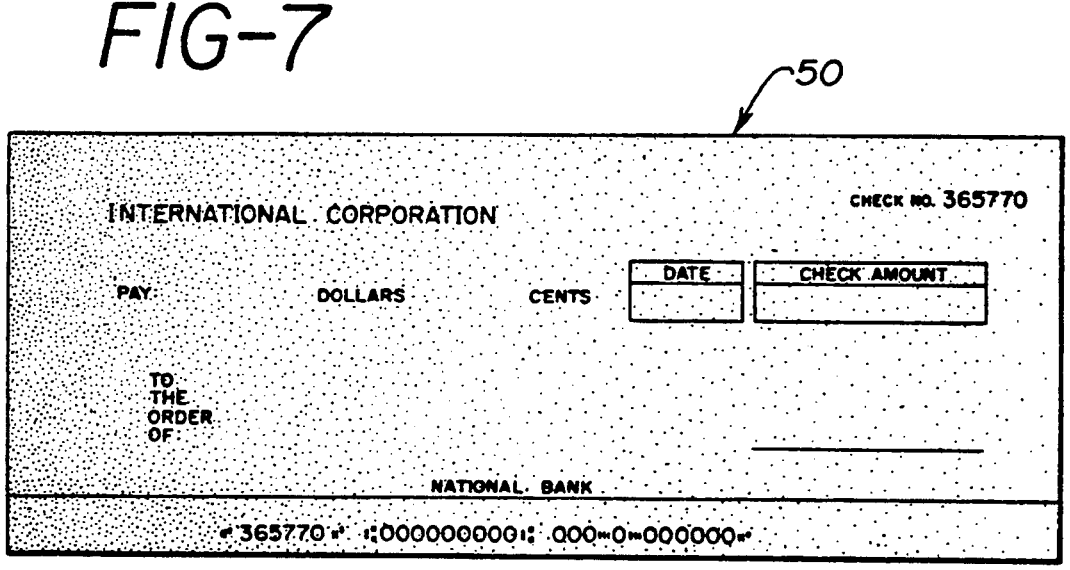
FIG. 7 is as illustration of an alternate embodiment of the present invention.

FIG. 7 shows an alternative embodiment of the present invention. The check 50 contains elements of background printed matter, elements of a cancellation term, and a camouflage pattern as illustrated above in respect to FIGS. 1-6. The tone of the elements varies across the face of the check 50. It could decrease from left to right as shown. This may be accomplished by varying the size of the halftone elements, their spacing, or both, across the face of the check 50. Other variations are possible.

Figure 8:
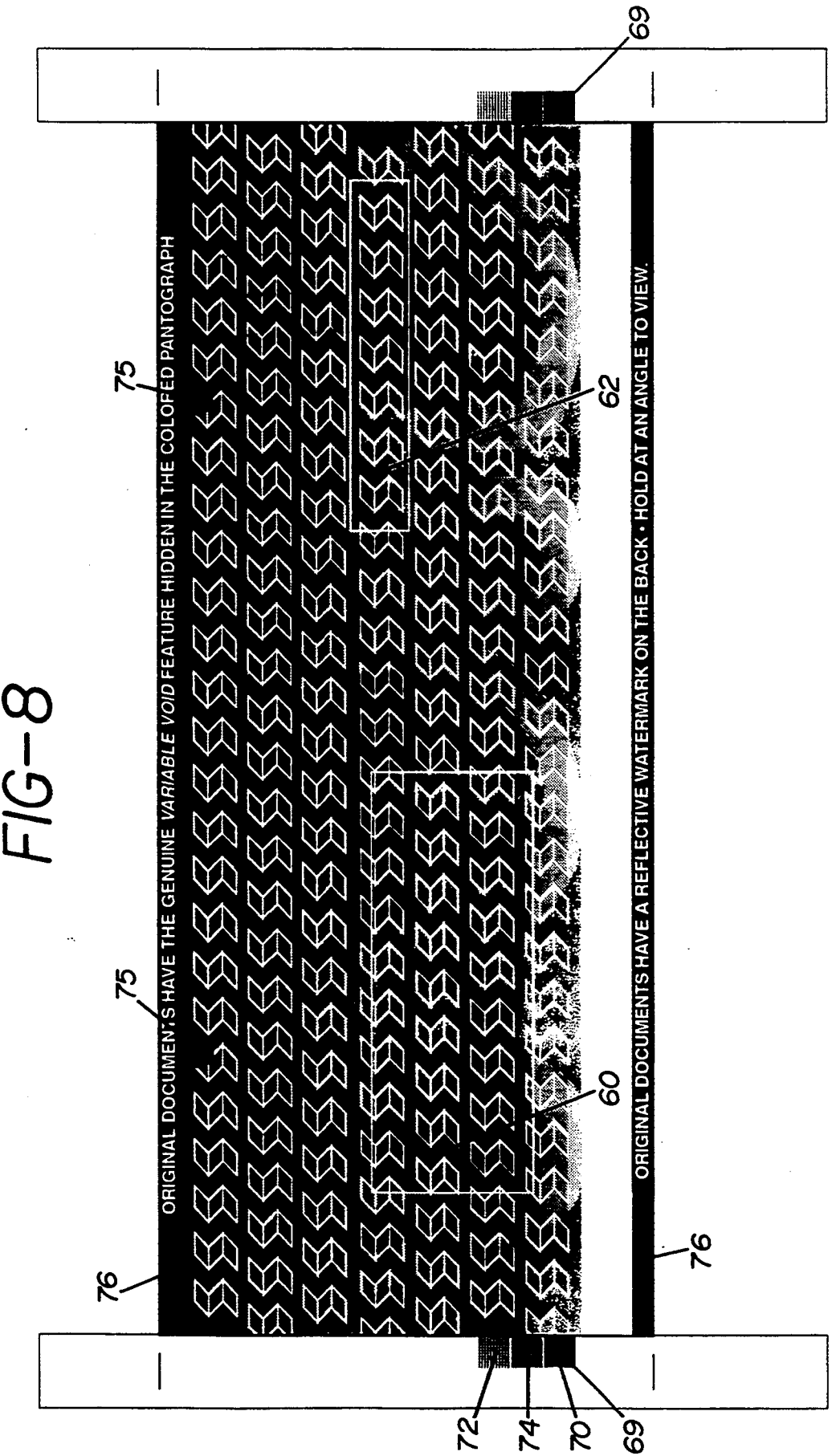
FIG. 8 is an illustration of another embodiment of the present invention.

FIG. 8 illustrates diagrammatically yet another embodiment of the present invention. In this embodiment, the frequencies of the elements of the background printed matter and the cancellation terms remain the same, while the size of the elements is varied across the document. This is called a graded screen. For example, the frequency might be 130 and 65 lines per inch for the background printed matter and the cancellation term, respectively. The size of the elements of the background printed matter may vary across the document from 50% of the area covered to 5%, and the cancellation term may vary across the document from 60% to 7%. In the illustrated document, the highest percentages of coverage are at the top of the document. These percentages are gradually reduced toward the bottom of the document. The illustrated document shows this change in coverage percentages as occurring in steps, producing bands of slightly different tone. If desired, however, the size of the dots may be continuously varied over the document surface. Regardless of the manner in which the dot size of the background printed matter and the dot size of the cancellation term are varied, the selection of dot sizes for a given area on the document is made such that they provide substantially equal tone.

The address area 60 and the amount area 62 are made of halftone elements which are substantially the same spacing as the background elements. These areas may contain the camouflage pattern or it may be omitted. The address area 60 and the amount area 62 are readable by image scanners. FIG. 8 also shows a quality control target 69 printed on the surface of the check. The quality control target comprises a high density area 70, a low density area 72, and an intermediate density area 74. Warning bands 76 of high density printing may be positioned at the top and bottom of the check 50 as shown. The low density printing may be used for portions such as the address and amount areas 60 and 62. Intermediate targets 75 may be provided in obscure areas of the form and printed without the camouflage pattern.

Figure 9:
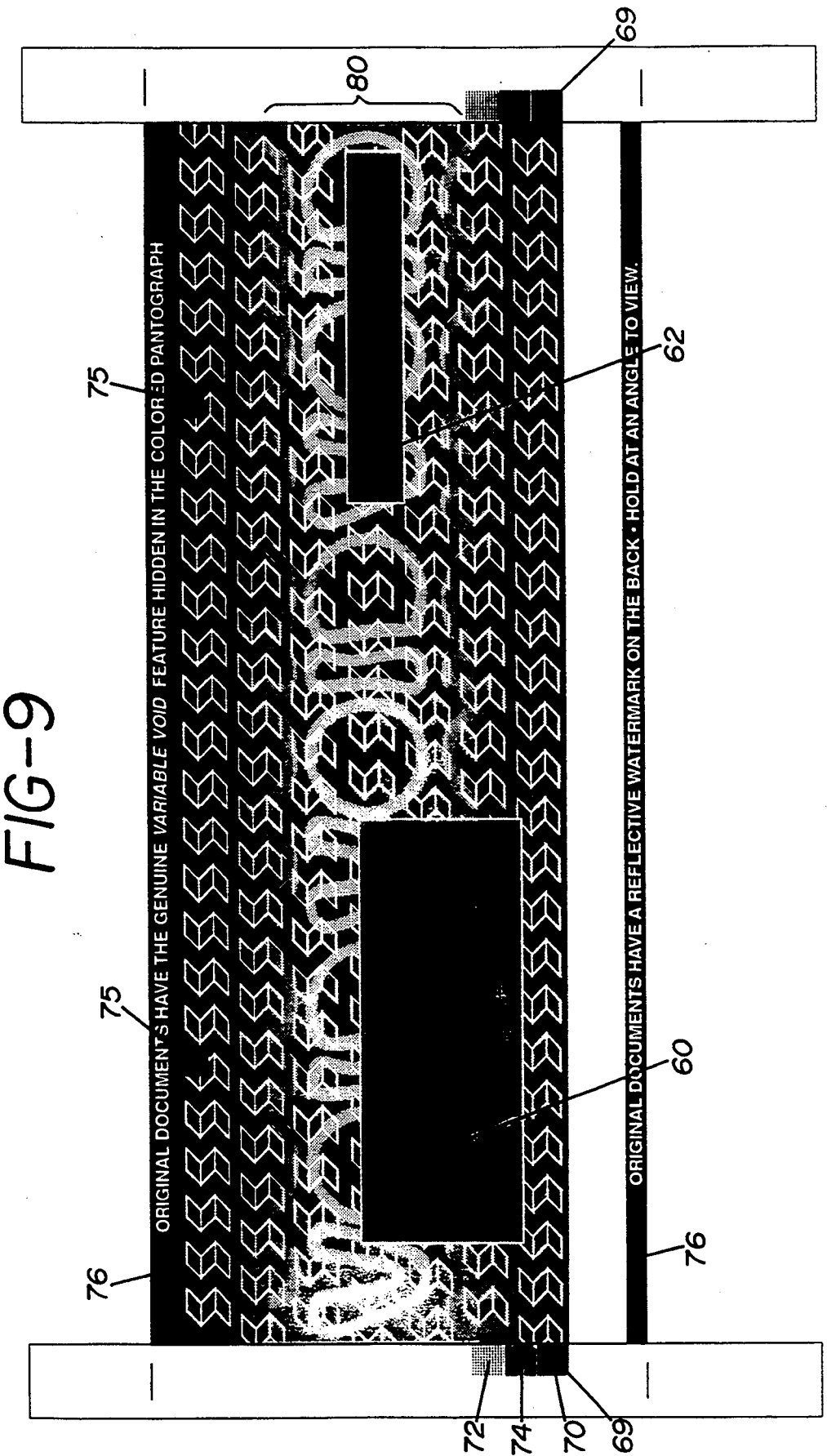
FIG. 9 is an illustration of an alternate embodiment of . the present invention.

FIG. 9 illustrates diagrammatically yet another embodiment of the present invention, with parts of the document corresponding to those of FIG. 8 being labeled with like reference numerals. In the embodiment of FIG. 9, the frequencies of the elements of the background printed matter and the cancellation terms are constant, while the size of the elements is varied across the document. In contrast to the embodiment of FIG. 8, however, the highest percentages of coverage by screen elements occurs at both the top and bottom of the document. The percentages are gradually reduced toward a central band 80 of generally uniform tone. As with FIG. 8, FIG. 9 shows the changes in percentage coverage occurring in steps, producing bands of slightly different tone. If desired, however, the size of the dots may be continuously varied over the document surface. Once again, the selection of dot sizes for given areas on the document is made such that they provide substantially equal tone.

Figure 10:
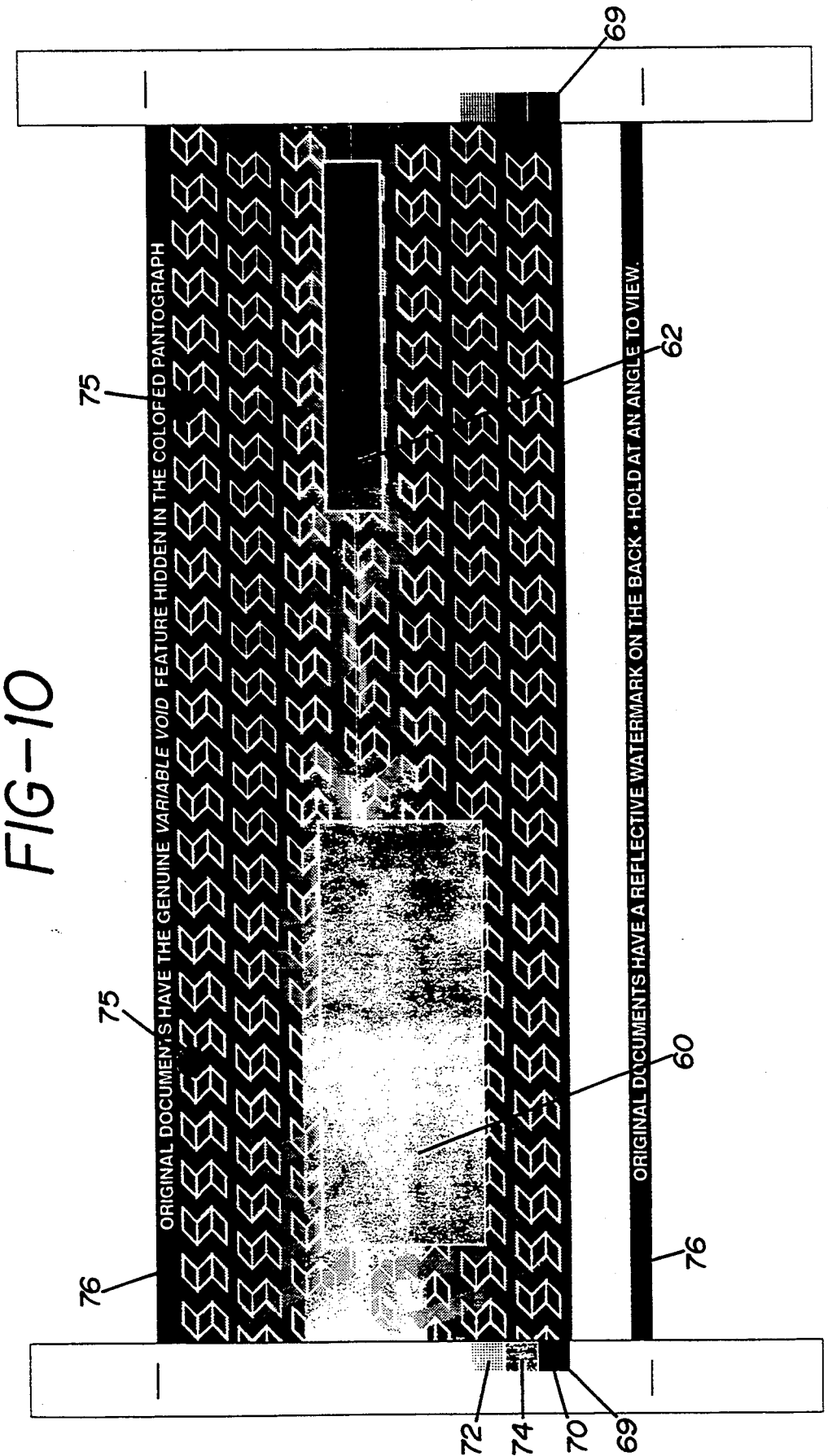
FIG. 10 is an illustration of another embodiment of present invention.

FIG. 10 illustrates diagrammatically a further embodiment of the present invention, with parts of the document corresponding to those of FIG. 8 being labeled with like reference numerals. In the embodiment of FIG. 10, the frequencies of the elements of the background printed matter and the cancellation terms are constant, while the size of the elements is varied across the document. In contrast to the embodiment of FIG. 9, the embodiment of FIG. 10 does not include a central band of generally uniform tone. Rather the percentage of coverage by the screen elements gradually decreases from the top and bottom of the document to the middle of the document. As with the other embodiments, the selection of dot sizes is made such that the background printed matter and the adjacent portions of the cancellation terms are of substantially equal tone.

It should be understood that the phrase "cancellation term" is intended to include not only words such as the word "VOID" shown in the drawings, but also words and phrases which simply make evident to an observer that the document being inspected is a copy of the original document. Such phrases as "PHOTOCOPY", "COPY", and "DUPLICATE" may be used for this purpose. Also intended to be included within the phrase "cancellation term" are words or symbols which may signify to the individual making the copy that the original document is authentic.

Figure 11:
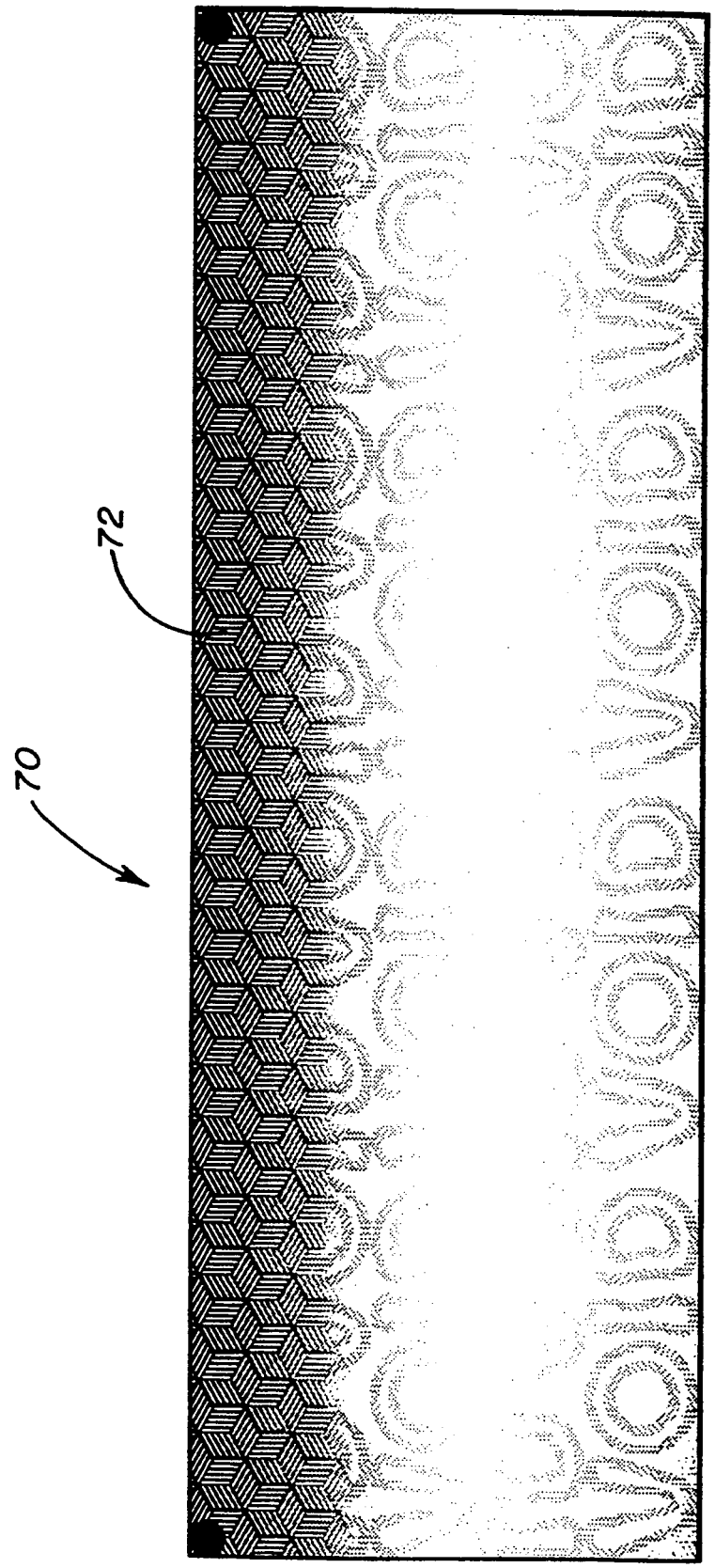
FIGS. 11, 12 and 13 illustrate another embodiment of the present invention.
Figure 12:
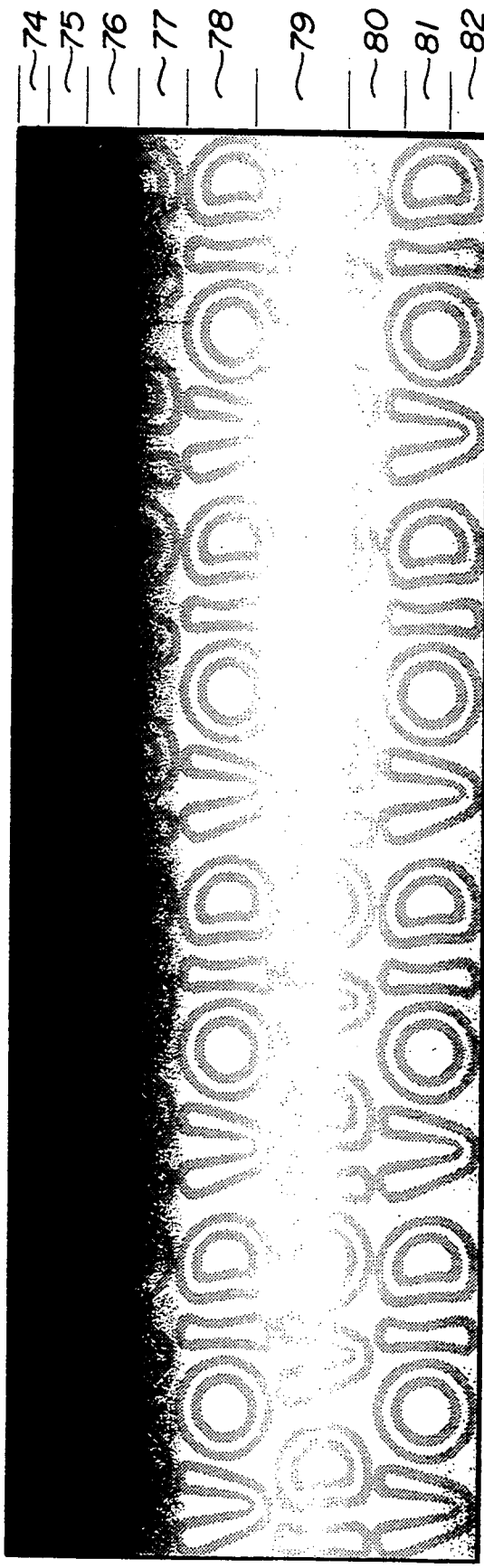
Figure 13:
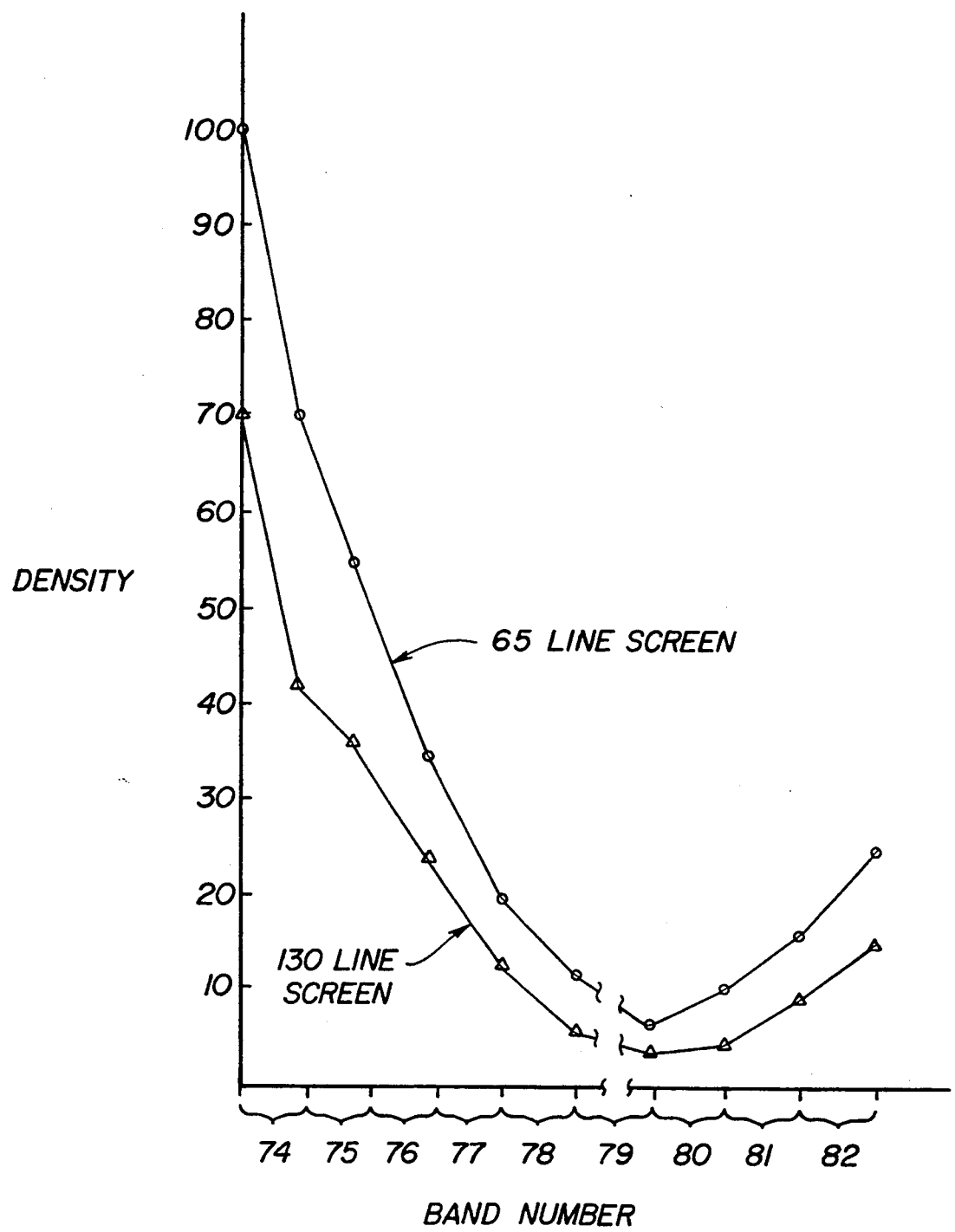

The present invention may be incorporated in a number of different security documents of varying design. FIGS. 11-13 illustrate yet another embodiment of the present invention. FIG. 11 shows the improved security document 70 with all alphanumeric printed matter removed, leaving only the background printed matter, the cancellation term, and the camouflage pattern printed on the substrate 72 having a surface for carrying indicia. The background printed matter consists of a pattern of elements of a first size and a first frequency such that the background printed matter is printed at a first density perceived by an observer as a first tone. The cancellation term consists of a pattern of elements of a second size and a second frequency such that the cancellation term is printed at a second density perceived by an observer as a second tone. As with the embodiments previously discussed, elements of one of the first size or the second size are sufficiently small such that they are not reproduced by a color copier at a particular copier setting, and elements of the other of the first size or the second size are sufficiently large such that they are reproduced by the color copier at the particular copier setting. As a consequence, a copy of the security document made on a color copier displays the cancellation term.

In this embodiment, the security document surface is divisible into a plurality of bands extending across the surface. This is more clearly shown in FIGS. 12 and 13, with the bands being designated by reference numerals 74 through 82. The document is illustrated with the entire surface divided into bands, but it should be understood that only a portion of the surface may be divided in this manner, if desired. Furthermore, the document is illustrated with the bands extending across the entire width of the document. If desired, however, other arrangements, such as non-parallel bands, extending radially outward from a common point, may be utilized. FIG. 12 illustrates the document of FIG. 11 as it would appear without the camouflage image, while FIG. 13 graphically depicts the change in densities of the areas printed with the first and second size elements. Note that the sizes of the elements of the first and second sizes vary across each of the bands. As a consequence, the density of the background printed matter and the density of the cancellation term vary together across each of the bands on the surface in a direction generally normal to the bands. By this arrangement, copying the security document without the cancellation term being apparent on at least some portion of the copy is impeded. It should be appreciated that in some instances the size of the elements of the first and second sizes will vary across less than all of the bands.

The camouflage pattern, defined by the absence of the elements of the first and second sizes in a pattern simulating blocks, disguises the cancellation term quite well. The degree to which this disguise is successful can be easily seen by comparing FIGS. 11 and 12.

It should be appreciated that any of a wide variety of camouflage images may be utilized in this fashion to disguise the cancellation terms on a security document according to the present invention. For a camouflage to be effective, the camouflage image usually occupies about 50% of the document surface area. A properly configured camouflage image becomes the dominant image in the eye of the casual observer. Although a camouflage pattern defined by the absence of elements is shown in FIG. 11, it will be understood that a camouflage pattern may also be defined by the presence of further elements.

As is apparent from FIG. 12, the cancellation term consists of a plurality of letters, each of which is approximately two bands in height. Actually, a plurality of cancellation terms are printed, with each cancellation term being printed over an associated pair of the plurality of bands. Specifically, the cancellation term consists of the word "VOID" repeated numerous times along each of the bands 74–82. Although the x-axis of FIG. 13 is not drawn to scale, it will be appreciated that the plurality of cancellation terms and the plurality of bands 74–82 vary in height. Band 79 is generally twice as high as the other bands.

A careful inspection of FIG. 12 reveals that while the tone of the background printed matter and the tone of the cancellation term are generally the same at each point on the document, still some differences between the tone of the background printed matter and the tone of the cancellation term do exist. The density of each portion of the surface printed with those elements which are sufficiently large such that they are reproduced by the color copier at the particular copier setting is greater than the density of adjacent portions of the surface printed with elements which are sufficiently small such that they are not reproduced by a color copier at the particular copier setting. These differences in tone and density enhance the ability of the security document of the present invention to impede copying without the cancellation term being apparent on a least some portion of the copy. Even with these differences in density and tone, however, the cancellation terms are sufficiently obscured by the camouflage image so as not to be apparent to the eye of a casual observer. It will be appreciated, however, that if desired the densities may be selected such that the tone of the background printed matter and the tone of the cancellation term are the same at each point on the document.

As will be noted from a review of FIG. 13, the density of the background printed matter and the density of the cancellation term vary together linearly across each of the plurality of bands. In some cases, however, the density of the background printed matter and the density of the cancellation term will vary together only across some of the plurality of bands. In the illustrated document, the background printed matter is printed with a 130 line per inch, halftone dot screen, and the cancellation term is printed with a 65 line per inch halftone dot screen. The density of the cancellation term in band 74 is 100%, meaning full ink coverage at the top of the band, and drops to 70% at the bottom of the band. Similarly, the density of the background printed matter in band 74 is 70% at the top of the band, and drops to 42% at the bottom of the band. Note that the density of the cancellation term in band 75 is 70% at the top of the band and drops to 55% at the bottom of the band. Similarly, the density of the background printed matter in band 75 is 42% at the top of the band, and drops to 36% at the bottom of the band. The density of the background printed matter and the density of the cancellation term along each edge of each of the bands 74 through 82 are substantially the same as the density of the background printed matter and the density of the cancellation term along the edges of the adjacent bands, respectively. As a consequence, the transition from one band to the next is accomplished in a manner that is not readily apparent to a casual observer.

The density of the security document may be varied in other ways. The density of the background printed matter and the density of the cancellation term vary together in a non-linear fashion across at least some of the bands. Reference is made to FIG. 14, which illustrates the density changes in the background printed matter and the cancellation terms of a security document having eight bands 83–90. Band 83 extends across the top edge of the document and band 90 extends across the bottom edge of the document. In this example, the heights of the bands for a document which is the size of a typical check are as follows.

| Band | Height (inches) |
| --- | --- |
| 83 | .175 |
| 84 | .200 |
| 85 | .450 |
| 86 | .475 |
| 87 | .500 |
| 88 | .450 |
| 89 | .225 |
| 90 | .211 |

In this example, the background printed matter is printed with a 130 line per inch, halftone dot screen at a 45° screen angle, and the cancellation term is printed with a 65 line per inch, halftone dot screen at a 45° screen angle. The density values are as follows.

| Band number | Cancellation term | | | | Background printed matter | | | |
| --- | --- | --- | --- | --- | --- | --- | --- | --- |
| | Taper | Start | Stop | Direct | Taper | Start | Stop | Direct |
| 83 | LIN | 55 | 70 | 90 | LIN | 36 | 42 | 90 |
| 84 | LOG | 35 | 55 | 90 | LOG | 25 | 36 | 90 |
| 85 | LOG | 35 | 20 | 270 | LOG | 25 | 14 | 270 |
| 86 | LOG | 20 | 12 | 270 | LOG | 14 | 7 | 270 |
| 87 | LIN | 12 | 7 | 270 | LIN | 7 | 5 | 270 |
| 88 | LIN | 11 | 7 | 90 | LIN | 6 | 5 | 90 |
| 89 | LOG | 17 | 11 | 90 | LOG | 11 | 6 | 90 |
| 90 | LOG | 17 | 26 | 270 | LOG | 11 | 16 | 270 |

In this table, the abbreviations used are as follows.

"Taper" indicates the type of change of the graduated screen between the start and the stop values. LIN indicates an equal change for equal distance increments between the start and stop boundaries. LOG indicates a more rapid change for equal distance increments closer to the start boundary and becoming progressively less closer to the stop boundary. It should be noted that the density of the background printed matter and the density of the cancellation term vary together in a logarithmic manner across at least some of the plurality of bands.

"Start" is the screen percentage selected to start the band. It may be at the top or bottom of the band depending on the direction of taper. "Stop" is the screen percentage selected to end the band. It may be at the top or bottom of the band depending on the direction of taper.

"Direct" is the direction of change in dot sizes between the start and stop boundaries. A notation of 270 means that the values change from the start value at the top of the band to the stop value at the bottom of the band. A notation of 90 means that the values change form the start value at the bottom of the band to the stop value at the top of the band.

If desired, a security document according to the present invention may be printed in more than one color ink. It has been found to be desirable to print the upper or lower bands of a document with a blue ink, and the remaining bands with a green ink. With a document in which the tone becomes progressively lighter toward the center portion of the document, the transition from blue to green is very subtle, and the color of the background printed matter and the color of the cancellation term appear to vary together over the surface. This technique permits the printing of a document in which a gradual blending of the colors is approximated.

To facilitate the blending of colors, overlapping of areas printed with the two colors is accomplished. As an example, if the upper half of a document is printed with blue ink and the lower half of the document is printed with green ink, the bottom band of the upper half of the document may also be printed with green ink. Preferably, this bottom band is printed in green ink only with smaller elements, and the screen angle of these smaller elements differs from the screen angle of the elements printed in blue ink. For example, elements printed in blue ink may have a screen angle of 45°, whereas elements printed in green ink may have a screen angle of 90°. A similar arrangement is provided for the upper band of the bottom half of the document. By this technique, the blue and green elements are, for the most part, not printed on top of each other, and both colors are visible.

It will be appreciated that differing arrangements may be utilized within the scope of the present invention to cause of the tone of the background printed matter and the tone of the cancellation term or terms to vary across at least some of the bands. For example, in another embodiment the sizes of the elements of the first and second sizes may vary across each of the bands and the frequencies of the elements of the first and second frequency may vary across each of the bands. In this embodiment, the density of the background printed matter and the density of the cancellation term vary together across each of the bands on the surface in a direction generally normal to the bands. In yet another embodiment, only the frequencies of the elements of the first and the second frequency varying across at least some of the bands such that the density of the background printed matter and the density of the cancellation term vary together across at least some of the bands on the surface in a direction generally normal to the bands.

It will be further appreciated that it may be desirable in some instances to provide an area of the document of the present invention with background printed matter and cancellation terms that do not vary in tone. This may be the case, where a uniformly light tone is desired to facilitate reading information that is to be printed later in this area. Further, it may be desirable in some instances to provide an area of the document without any of the larger sized elements that make up either the background printed matter or the cancellation terms. This may be the case where it is desired to print machine scannable characters in this area, and the larger elements may impede character recognition.

Having described the improved security document of the present invention in detail and by reference to different embodiments thereof, it will be apparent that certain modifications and variations are possible without departing from the scope of the invention defined in the appended claims.

What is claimed is:

1. An improved security document, comprising:
a substrate having a surface for carrying indicia;
background printed matter on said surface, said background printed matter consisting of a pattern of elements of a first size and a first frequency such that said background printed matter is printed at a first density perceived by an observer as a first tone; and
a cancellation term printed on said surface, said cancellation term consisting of a pattern of elements of a second size and a second frequency such that said cancellation term is printed at a second density perceived by an observer as a second tone, elements of one of said first size or said second size being sufficiently small such that they are not reproduced by a color copier at a particular copier setting, and elements of the other of said first size or said second size being sufficiently large such that they are reproduced by said color copier at said particular copier setting, so that a copy of said security document made on a color copier displays said cancellation term, at least a portion of said security document surface being divisible into a plurality of bands extending across said surface, the sizes of said elements of said first and second sizes varying across each of said bands and the frequencies of said elements of said first and second frequency varying across each of said bands such that the density of said background printed matter and the density of said cancellation term vary together across each of said bands on said surface, thereby impeding copying said security document without said cancellation term being apparent on at least some portion of the copy of said security document.

2. The improved security document of claim 1 in which the density of said background printed matter and the density of said cancellation term vary together linearly across at least some of said plurality of bands.

3. The improved security document of claim 1 in which the tone of each portion of the surface printed with those elements which are sufficiently large such that they are reproduced by said color copier at said particular copier setting is greater than the tone of adjacent portions of the surface printed with elements which are sufficiently small such that they are not reproduced by a color copier at a particular copier setting.

4. The improved security document of claim 1 further comprising a camouflage pattern on said surface to disguise said cancellation term.

5. The improved security document of claim 4 in which said camouflage pattern is defined by the absence of said elements of said first and second sizes.

6. The improved security document of claim 4 in which said camouflage pattern is defined by the presence of further elements.

7. The improved security document of claim 1 in which said cancellation term consists of a plurality of letters, each of which is approximately two bands in height.

8. The improved security document of claim 1 in which the density of said background printed matter and the density of said cancellation term vary together in a non-linear fashion across at least some of said plurality of bands.

9. The improved security document of claim 8 in which the density of said background printed matter and the density of said cancellation term vary together in a logarithmic manner across at least some of said plurality of bands.

10. The improved security document of claim 1 in which the density of said background printed matter and the density of said cancellation term along each edge of each band are substantially the same as the density of said background printed matter and the density of said cancellation term along the edge of the adjacent band, respectively.

11. The improved security document of claim 1 in which a plurality of cancellation terms are printed on said surface, at least some of said plurality of cancellation terms being printed over more than one of said plurality of bands.

12. The improved security document of claim 11 in which said plurality of cancellation terms and said plurality of bands vary in height.

13. The improved security document of claim 1 in which the color of said background printed matter and the color of said cancellation term vary together over said surface.

14. The improved security document of claim 13 in which the upper portion of said security document is printed with a first color and the lower portion of the security document is printed with a second color, and in which the color transition area in the central portion of the security document is printed in both colors at a relatively low density.

15. The improved security document of claim 14 in which the screen angle of the pattern of elements in said central portion printed with said first color differs from the screen angle of the pattern or elements in said central portion printed with said second color, thereby facilitating a smooth transition between colors.

16. The improved security document of claim 1 in which the tone of each portion of the surface printed with those elements which are sufficiently large such that they are reproduced by said color copier at said particular copier setting is substantially the same as the tone of adjacent portions of the surface printed with elements which are sufficiently small such that they are not reproduced by a color copier at a particular copier setting.

17. An improved security document, comprising:
a substrate having a surface for carrying indicia;
background printed matter on said surface, said background printed matter consisting of a pattern of elements of a first size and a first frequency such that said background printed matter is printed at a first density perceived by an observer as a first tone; and
a cancellation term printed on said surface, said cancellation term consisting of a pattern of elements of a second size and a second frequency such that said cancellation term is printed at a second density perceived by an observer as a second tone, elements of one of said first size or said second size being sufficiently small such that they are not reproduced by a color copier at a particular copier setting, and elements of the other of said first size or said second size being sufficiently large such that they are reproduced by said color copier at said particular copier setting, so that a copy of said security document made on a color copier displays said cancellation term, at least a portion of said security document surface being divisible into a plurality of bands extending across said surface, the sizes of said elements of said first and second sizes varying across each of said bands such that the density of said background printed matter and the density of said cancellation term vary together across each of said bands on said surface, thereby impeding copying said security document without said cancellation term being apparent on at least some portion of the copy of said security document.

18. The improved security document of claim 17 in which the density of said background printed matter and the density of said cancellation term vary together linearly across at least some of said plurality of bands.

19. The improved security document of claim 17 in which the tone of each portion of the surface printed with those elements which are sufficiently large such that they are reproduced by said color copier at said particular copier setting is greater than the tone of adjacent portions of the surface printed with elements which are sufficiently small such that they are not reproduced by a color copier at a particular copier setting.

20. The improved security document of claim 17 further comprising a camouflage pattern on said surface to disguise said cancellation term.

21. The improved security document of claim 20 in which said camouflage pattern is defined by the absence of said elements of said first and second sizes.

22. The improved security document of claim 20 in which said camouflage pattern is defined by the presence of further elements.

23. The improved security document of claim 17 in which said cancellation term consists of a plurality of letters, each of which is approximately two bands in height.

24. The improved security document of claim 17 in which the density of said background printed matter and the density of said cancellation term vary together in a non-linear fashion across at least some of said plurality of bands.

25. The improved security document of claim 24 in which the density of said background printed matter and the density of said cancellation term vary together in a logarithmic manner across at least some of said plurality of bands.

26. The improved security document of claim 17 in which the density of said background printed matter and the density of said cancellation term along each edge of each band are substantially the same as the density of said background printed matter and the density of said cancellation term along the edge of the adjacent band, respectively.

27. The improved security document of claim 17 in which a plurality of cancellation terms are printed on said surface, at least some of said plurality of cancellation terms being printed over more than one of said plurality of bands.

28. The improved security document of claim 27 in which said plurality of cancellation terms and said plurality of bands vary in height.

29. The improved security document of claim 17 in which the color of said background printed matter and the color of said cancellation term vary together over said surface.

30. The improved security document of claim 29 in which the upper portion of said security document is printed with a first color and the lower portion of the security document is printed with a second color, and in which the color transition area in the central portion of the security document is printed in both colors at a relatively low density.

31. The improved security document of claim 30 in which the screen angle of the pattern of elements in said central portion printed with said first color differs from the screen angle of the pattern of elements in said central portion printed with said second color, thereby facilitating a smooth transition between colors.

32. The improved security document of claim 17 in which the tone of each portion of the surface printed with those elements which are sufficiently large such that they are reproduced by said color copier at said particular copier setting is substantially the same as the tone of adjacent portions of the surface printed with elements which are sufficiently small such that they are not reproduced by a color copier at a particular copier setting.

33. An improved security document, comprising:
a substrate having a surface for carrying indicia;
background printed matter on said surface, said background printed matter consisting of a pattern of elements of a first size and a first frequency, such that said background printed matter is printed at a first density perceived by an observer as a first tone; and
a cancellation term printed on said surface, said cancellation term consisting of a pattern of elements of a second size and a second frequency such that said cancellation term is printed at a second density perceived by an observer as a second tone, elements of one of said first size or said second size being sufficiently small such that they are not reproduced by a color copier at a particular copier setting, and elements of the other of said first size or said second size being sufficiently large such that they are reproduced by said color copier at said particular copier setting, so that a copy of said security document made on a color copier displays said cancellation term, at least a portion of said security document surface being divisible into a plurality of bands extending across said surface, and the frequencies of said elements of said first and said second frequency varying across each of said bands such that the density of said background printed matter and the density of said cancellation term vary together across each of said bands on said surface, thereby impeding copying said security document without said cancellation term being apparent on at least some portion of the copy of said security document.

34. The improved security document of claim 33 in which the density of said background printed matter and the density of said cancellation term vary together linearly across at least some of said plurality of bands.

35. The improved security document of claim 33 in which the tone of each portion of the surface printed with those elements which are sufficiently large such that they are reproduced by said color copier at said particular copier setting is greater than the tone of adjacent portions of the surface printed with elements which are sufficiently small such that they are not reproduced by a color copier at a particular copier setting.

36. The improved security document of claim 33 further comprising a camouflage pattern on said surface to disguise said cancellation term.

37. The improved security document of claim 36 in which said camouflage pattern is defined by the absence of said elements of said first and second sizes.

38. The improved security document of claim 36 in which said camouflage pattern is defined by the presence of further elements.

39. The improved security document of claim 33 in which said cancellation term consists of a plurality of letters, each of which is approximately two bands in height.

40. The improved security document of claim 33 in which the density of said background printed matter and the density of said cancellation term vary together in a non-linear fashion across at least some of said bands.

41. The improved security document of claim 40 in which the density of said background printed matter and the density of said cancellation term vary together in a logarithmic manner across at least some of said plurality of bands.

42. The improved security document of claim 3 in which the density of said background printed matter and the density of said cancellation term along each edge of each band are substantially the same as the density of said background printed matter and the density of said cancellation term along the edge of the adjacent band, respectively.

43. The improved security document of claim 33 in which a plurality of cancellation terms are printed on said surface, at least some of said plurality of cancellation terms being printed over more than one of said plurality of bands.

44. The improved security document of claim 43 in which said plurality of cancellation terms and said plurality of bands vary in height.

45. The improved security document of claim 33 in which the color of said background printed matter and the color of said cancellation term vary together over said surface.

46. The improved security document of claim 45 in which the upper portion of said security document is printed with a first color and the lower portion of the security document is printed with a second color, and in which the color transition area in the central portion of the security document is printed in both colors at a relatively low density.

47. The improved security document of claim 46 in which the screen angle of the pattern of elements in said central portion printed with said first color differs from the screen angle of the pattern of elements in said central portion printed with said second color, thereby facilitating a smooth transition between colors.

48. The improved security document of claim 33 in which the tone of each portion of the surface printed with those elements which are sufficiently large such that they are reproduced by said color copier at said particular copier setting is substantially the same as the tone of adjacent portions of the surface printed with elements which are sufficiently small such that they are not reproduced by a color copier at a particular copier setting.

* * * * *

UNITED STATES PATENT AND TRADEMARK OFFICE
CERTIFICATE OF CORRECTION

PATENT NO. : 5,340,159
DATED : August 23, 1994
INVENTOR(S) : William H. Mowry, Jr.

It is certified that error appears in the above-indentified patent and that said Letters Patent is hereby corrected as shown below:

```
Col. 13, Line 25, "pattern or elements" should be
 --pattern of elements--.
Col. 16, Line 20, "claim 3" should be
 --claim 33--.
```

Signed and Sealed this

Sixth Day of December, 1994

*Attest:*

BRUCE LEHMAN

*Attesting Officer*     *Commissioner of Patents and Trademarks*